(12) United States Patent
Hughes (10) Patent No.: US 9,554,669 B1
(45) Date of Patent: Jan. 31, 2017

(54) ADJUSTABLE GRILLING PLATFORM

(71) Applicant: Rick Hughes, Bedford, KY (US)

(72) Inventor: Rick Hughes, Bedford, KY (US)

( * ) Notice: Subject to any disclaimer, the term of this patent is extended or adjusted under 35 U.S.C. 154(b) by 345 days.

(21) Appl. No.: 14/264,688

(22) Filed: Apr. 29, 2014

Related U.S. Application Data (60) Provisional application No. 61/935,571, filed on Feb. 4, 2014.

(51) Int. Cl.
*A47J 37/00* (2006.01)
*A47J 33/00* (2006.01)

(52) U.S. Cl.
CPC ..................... *A47J 33/00* (2013.01)

(58) Field of Classification Search
CPC ...... A47J 33/00; A47J 37/049; A47J 37/0704; A47J 2037/0795; A47J 2037/0763
See application file for complete search history.

(56) References Cited

U.S. PATENT DOCUMENTS

| | | | |
|---|---|---|---|
| 4,043,260 A * | 8/1977 | LaPour | A47J 37/0763 126/30 |
| 4,083,354 A | 4/1978 | Claire et al. | |
| 4,979,490 A | 12/1990 | Nudo et al. | |
| 5,660,101 A * | 8/1997 | Cirigliano | A47J 37/047 126/25 A |
| 5,713,344 A | 2/1998 | Gilbert | |
| 5,848,584 A | 12/1998 | Brog | |
| 5,850,829 A | 12/1998 | Taylor et al. | |
| 5,931,085 A | 8/1999 | Benzschawel | |
| 6,131,560 A | 10/2000 | Healy | |
| 6,711,993 B2 | 3/2004 | Robertson | |
| 7,980,241 B1 | 7/2011 | White | |
| 8,272,601 B2 | 9/2012 | Kocher | |

OTHER PUBLICATIONS http://www.amazon.com/Campfire-Tri-Pod-Grill-Adjustable-Height/dp/B003LNUAGC Accessed Sep. 4, 2013.
Steelman Cooking System. hdp://campfirecookingsystem.com/steelman.html Accessed Sep. 4, 2013.

* cited by examiner

*Primary Examiner* — Alfred Basichas
(74) *Attorney, Agent, or Firm* — Robert C. Montgomery; Montgomery Patent & Design LP.

(57) ABSTRACT

An apparatus is adapted to be placed over an open flame source and employed as a grilling surface for cooking. The apparatus further has a flat grilling platform, a support frame, and a hoist assembly. The grilling platform is operatively suspended from the support frame by the hoist assembly such that the hoist assembly can raise and lower the grilling platform as desired. An embodiment of the apparatus provides for a fire box to facilitate construction and containment of a fire for use with the apparatus.

18 Claims, 5 Drawing Sheets

ADJUSTABLE GRILLING PLATFORM

RELATED APPLICATIONS

The present invention was first described in and claims the benefit of U.S. Provisional Application No. 61/935,571, filed Feb. 4, 2014, the entire disclosures of which are incorporated herein by reference.

FIELD OF THE INVENTION

The present invention relates generally to an adjustable platform adapted to be placed over an open flame source and employed as a grilling surface for cooking.

BACKGROUND OF THE INVENTION

Whether cooked on a grill or over a campfire, food cooked outdoors just always seems to taste better than food cooked indoors. It could be the outdoor air, cooking procedures, or a hundred other variables, but one's taste buds just seem to explode. Many people who cook outdoors as part of a camping trip use a grill, which must be brought along for the trip including fuel, legs, cooking surfaces, and the like. Even those who cook on a campfire must bring a complicated stand with multiple legs that seem to collapse, and are never long enough to place food high above a fire. Another option is a complicated tripod arrangement which is difficult to set up, and then can only be used with a kettle. All of these solutions are either complicated, difficult to store, hard to transport, and/or require many solutions depending on the type of food being cooked. Accordingly, there exists a need for a means by which virtually any type of food can be cooked over a campfire without the disadvantages as described above. The development of the adjustable grilling platform fulfills this need.

The apparatus is used to assist with cooking over an open fire. There are two vertical supports facilitating slidable engagement with a grated cooking surface. The cooking surface is held in position by two (2) cables that are routed around pulleys disposed at a top of the apparatus. These cables then terminate at a hoist assembly, which enables selective hoisting and lowering of the cooking surface. The slidable engagement of the cooking surface with the vertical supports also provides for locking pins to hold the cooking surface at a desired height. An alternative embodiment provides for a fire box in which a fire may be constructed and contained.

Prior art in this field consists of simple posts that have cooking grates attached thereto. Some of these posts have pivoting arms connecting the cooking grate. Other prior art posts include pivoting arms with clamping apparatuses to attach pans, plates, or grates. Some prior art devices are more elaborate and consist of stands with height adjustable cooking surfaces, but these cooking surfaces are not stabilized from swinging and swaying, as is the cooking surface of the present invention. There are other prior art devices that have stabilized adjustable cooking surfaces, but these are height adjustable by telescoping support legs. With these telescoping legs, it proves difficult to adjust the cooking surface when food is placed thereupon and when there is a fire beneath the device. Furthermore, this type of adjustment means impedes the ability to perform large scale cooking because it does not lend itself to easy height adjustment with heavy items.

It is an objective of the present invention to provide a stable and sturdy cooking surface for cooking foods over an open fire.

It is a further objective of the present invention to provide a height adjustment mechanism for the cooking surface to accommodate fires of variable height and differing cooking temperatures dictated by certain cooking recipes.

It is a further objective of the present invention to provide a cooking surface with a stand that is modular and easily disassembled for easy transport and set up It is a further objective of the present invention to provide a cooking surface that is stabilized such that it neither swings when bumped nor sways in the wind.

It is a further objective of the present invention to provide a cooking surface that is adjustable without disrupting the food placed thereupon, thereby evenly and smoothly hoisting and lowering the cooking surface.

It is a further objective of the present invention to enable hoisting and lowering the cooking surface with a fire occurring beneath the device and while the food is being cooked.

It is a further objective of the present invention to provide a height adjustable cooking surface that facilitates heavy duty cooking of large meals while not detracting from portability and ease of use.

It is a further objective of the present invention to provide a fire box as a means to construct and contain an open fire, if desired.

It is a further objective of the present invention to provide a plurality of skewers to enable broiling of meat impaled thereupon.

SUMMARY OF THE INVENTION

The apparatus comprises two (2) leg assemblies supporting a platform assembly. The platform assembly is configured to slidably traverse the leg assemblies to provide a height adjusting cooking surface. There is also a hoist assembly that is used to assist a user with adjusting the height of the cooking surface. The platform assembly is preferably a grated surface to facilitate broiling, heat transfer, convective flow, and drainage of cooked fluids from the meat placed upon it. A plurality of skewers extends from at least one (1) edge of the platform upon which food items may be impaled for cooking.

A top portion of the apparatus has an upper bar assembly that is removable. This upper bar assembly is equipped with a first, second, and third pulley. A first cable extends from the hoist assembly and is routed through the first pulley, the third pulley, and then attached to the platform. A second cable extends from the hoist assembly and is routed through the second pulley and then attached to the platform. Actuation of the hoist assembly acts upon each cable simultaneously and either hoists or lowers the platform. The platform is further provided with locking pins to enable a user to secure the platform at a desired height.

An alternative embodiment of the invention provides for a fire box in which a fire can be constructed and contained for use with the apparatus.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

DESCRIPTIVE KEY 10 adjustable grilling platform
20 leg assembly
22 stabilizer
24 upright
26 upper end
28 winch aperture
30 platform assembly
32 frame
34 first tube
36 second tube
38 lateral tube
42 grate
44 skewer
45 angle
46 arm
48 guide
52 lock pin
53 tee handle
54 threaded aperture
56 eyebolt
58 retainer
60 upper bar assembly
62 upper bar
64 insert tube
66 first pulley
67 first pulley bracket
68 second pulley
69 second pulley bracket
72 third pulley
73 third pulley bracket
74 mounting pin
76 pin retainer
78 bracket fastener
79 threaded retainer
80 hoist assembly
82 winch
84 drum
86 wire rope guide
88 drum latch mechanism
92 crank
94 handle
96 winch fastener
102 first cable
104 second cable
106 cable loop
112 snap hook
114 eye
118 hook
122 cable clamp
130 fire box
132 sidewall
134 bottom
138 coal bed
142 handle

DETAILED DESCRIPTION OF THE PREFERRED EMBODIMENT

Figure 3:
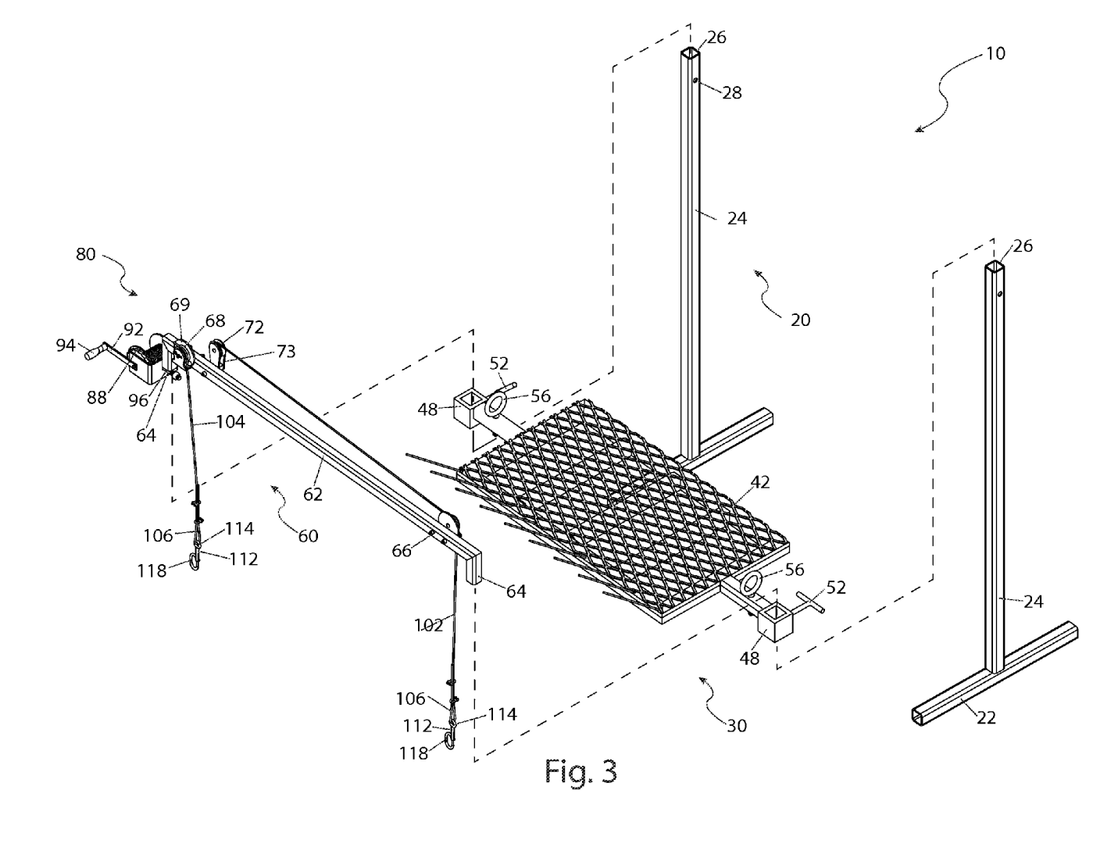
FIG. 3 is an exploded view of the adjustable grilling platform 10 in accordance with the preferred embodiment of the present invention.
Figure 4:
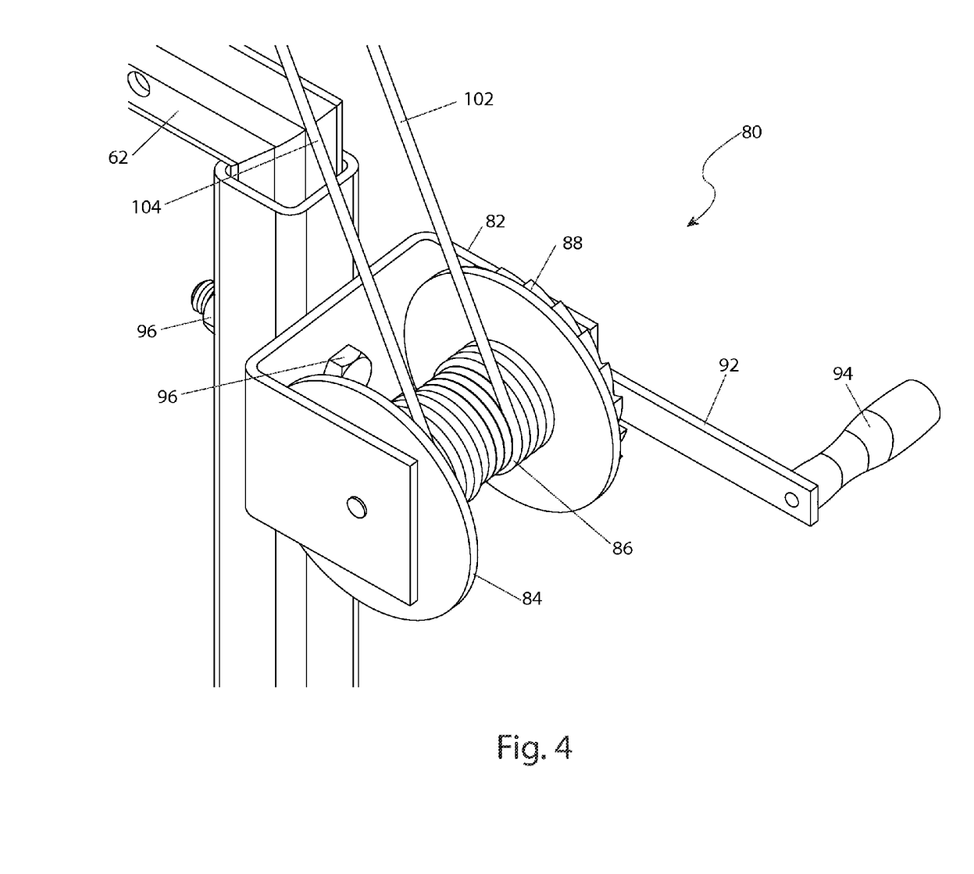
FIG. 4 is a detail view of a wire rope guide 86 of the adjustable grilling platform 10 in accordance with the preferred embodiment of the present invention; and, FIG. 5 is a perspective view of the adjustable grilling platform 10 illustrated with a fire box 130 in accordance with an alternate embodiment of the present invention.
Figure 5:
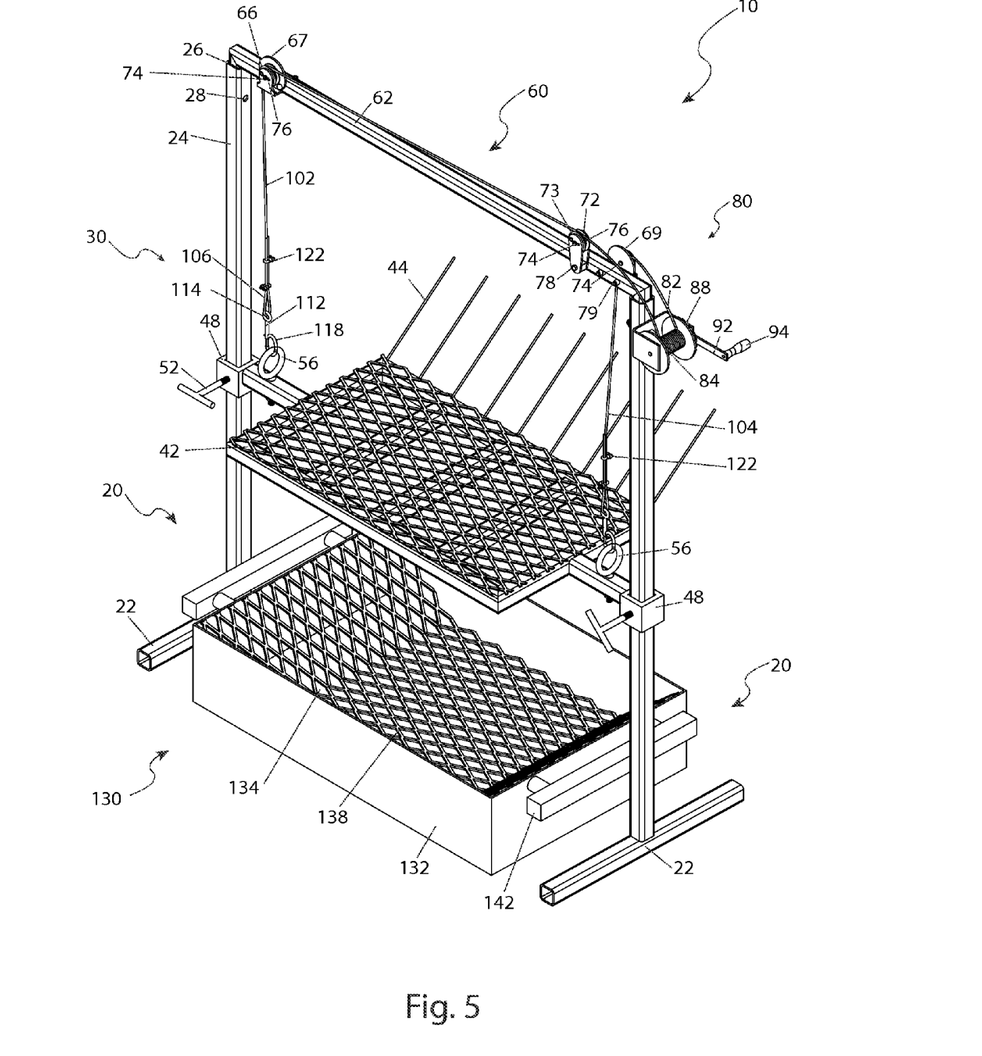

The best mode for carrying out the invention is presented in terms of its preferred embodiment, herein depicted within FIGS. 1 through 4, with an alternate embodiment within FIG. 5. However, the invention is not limited to the described embodiment, and a person skilled in the art will appreciate that many other embodiments of the invention are possible without deviating from the basic concept of the invention and that any such work around will also fall under the scope of this invention It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an adjustable grilling platform (herein referred to as the "apparatus") 10, which provides an adjustable height surface for cooking foods over an open fire when the source of the heat may be at a variable height.

Figure 1:
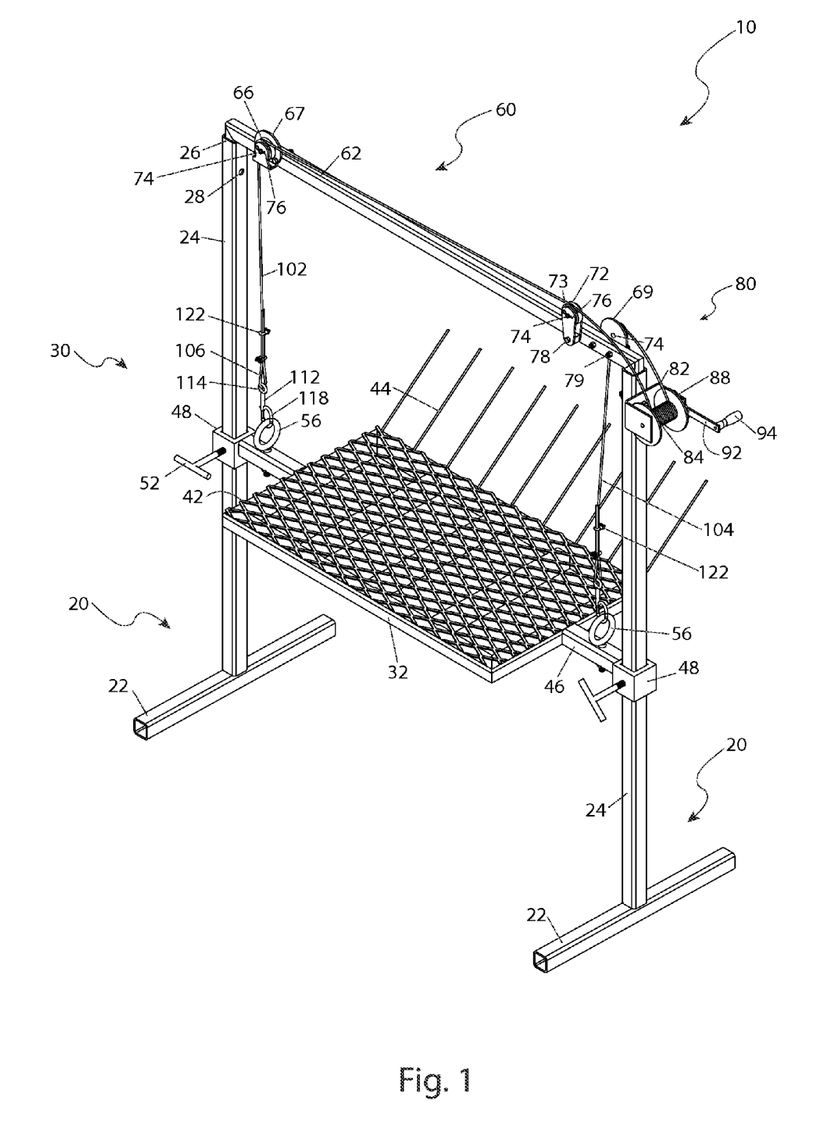
FIG. 1 is a perspective view of an adjustable grilling platform 10 in accordance with the preferred embodiment of the present invention.

Referring now to FIG. 1, a perspective view, and FIG. 3, an exploded view, of the apparatus 10 according to the preferred embodiment of the present invention, is disclosed. The apparatus 10 includes a platform assembly 30 supported on two (2) leg assemblies 20, a removable upper bar assembly 60, and a hoist assembly 80. Each leg assembly 20 is configured generally as an inverted "T" with an upright 24 attached perpendicularly to the midpoint of a horizontal stabilizer 22. The upright 24 and the stabilizer 22 preferably compose square steel tubes which are coated, or plated, with a material to inhibit corrosion. An upper end 26 of the upright 24 is left open to accept an insert tube 64 of the upper bar assembly 60 to be slid into the upper end 26. Disposed along an upper side of each upright is a winch aperture 28. Only the winch aperture 28 on one (1) upright will be utilized for the attachment of a winch 82, however, a greater uniformity is achieved when a winch aperture 28 is included in both uprights 24.

Figure 2:
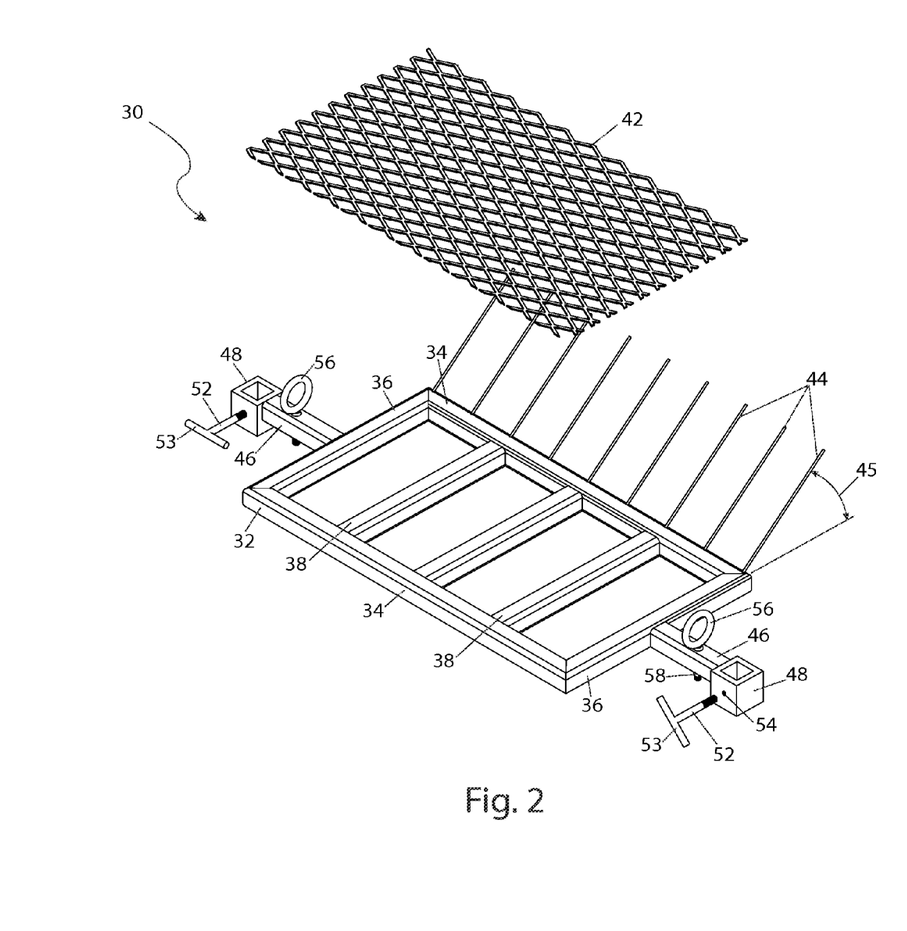
FIG. 2 is a detail view of the platform assembly 30 of the adjustable grilling platform 10 in accordance with the preferred embodiment of the present invention.

The platform assembly 30, as more clearly seen in FIG. 2, preferably comprises a planar, rectangular frame 32 with guides 48 attached to arms 46 on each side. The frame 32 is configured to be two (2) parallel, opposing first tubes 34 welded to two (2) perpendicular opposing second tubes 36. The first tubes 34 and the second tubes are preferably steel tubes with a square or rectangular cross-section. Other materials, and other shapes, may be used in the fabrication of the frame 32. The ends of all first tubes 34 and all second tubes 36 are preferably cut on a forty five degree (45°) miter and welded together such that the internal surfaces of all tubes 34 and 36 are sealed. A plurality of lateral tubes 38 are uniformly positioned between the first tubes 34 and continuously welded, with appropriate bead, around the perimeter of each end to permanently secure the lateral tubes 38. The lateral tubes 38 span the distance between the first tubes 34. The grate 42 is preferably a piece of expanded metal sheeting configured to be attached to the upper surface of the frame 32. Other materials, such as a plurality of rods, may be used in the construction of the grate 42 without limiting the scope of the apparatus 10.

A plurality of skewers 44 is attached to at least one (1) of the first tubes 24 at a non-zero angle 45. The skewer 44 is a small diameter metal rod upon which an item of food may be impaled for cooking. The preferred angle 45 of orientation for the skewers 44 would be within a range from thirty degrees (30°) to forty five degrees (45°) with respect to the horizontal. The first tube 24 to which the skewers 44 are attached will be defined as the back, or rear, of the platform assembly 30.

Attached to each side of the rectangular frame 32, preferably by welding, is an arm 46. The arms 46 are square steel tubes configured to be attached at a first end to an exterior side of each second tube 36. Attached to a second end of each arm 46 is a guide 48. The guide 48 is a sleeve configured to have a profile necessary to encompass a single upright 24 of the leg assembly 20. The guides 48 restrict the lateral movement of the platform assembly 30 as the platform assembly 30 is raised or lowered above a fire.

Disposed in the upper and the lower faces of each arm 46 is an aperture (not shown) into which an eyebolt 56 is fastened. The eyebolt 56 is configured with a closed eye and a threaded shank. The eyebolt 56 may be provided with a shoulder between the eye and the shank; however this is not a defining point of the apparatus 10. The eyebolts 56 are secured in each arm 46 by means of a threaded retainer 58.

Disposed along a front side of at least one (1) of the guides 48 is a threaded aperture 54 into which a locking pin is inserted. The constituent material of the guide 48 may be of a sufficient thickness to permit an adequate thread depth, or alternately a threaded retainer may be attached to the guide 48 over an aperture. The locking pin 52 is configured to be a threaded rod to which a tee handle 53 is attached to increase the moment arm, thus permitting more torque to be developed on the locking pin 52. The locking pin 52 is intended to prevent relative motion between the guide 48 and an upright 24 inserted therein.

The upper bar assembly 60 includes an upper tube 62 having insert tubes 64 attached perpendicularly at either end. The upper tube 62 and the insert tubes 64 preferably comprise square tubing of a size which can be inserted into the upper ends 26 of the uprights 24 of the leg assembly 20. The ends of the upper tube 62 and the conjoined ends of the insert tubes 64 are preferably cut on a forty five degree (45°) miter and welded together.

Disposed along the upper bar 62 are a first pulley 66 configured to be mounted in a first pulley bracket 67, a second pulley 68 mounted in a second pulley bracket 69, and a third pulley 72 mounted a third pulley bracket 73. Each of the pulleys 66, 68, and 72 is retained in the respective brackets 67, 69, and 73 by means of mounting pin 74 which is in each case secured with a pin retainer 76. The mounting pins 74 also act as axles for each of the pulleys 66, 68, and 72 to allow rotational motion. The first pulley bracket 67 is similar to the second pulley bracket 69. The first pulley bracket 67 is attached to a first end of the upper bar 62 by means of at least one (1) bracket fastener 78 inserted through the first pulley bracket 67 and an aperture (not shown) in the upper bar 62 and retained with a threaded retainer 79. The second pulley bracket 69 is attached in a generally similar manner to a second end of the upper bar 62. The third pulley bracket 73 is attached to the upper bar 62 in proximity to, but laterally opposed to, the second pulley bracket 69. This third pulley bracket 73 is configured to retain the third pulley 72 at a somewhat greater elevation above the upper bar 62 than either the first pulley 66 or the second pulley 68.

The hoist assembly 80 includes a winch 82, a first cable 102, and a second cable 104. The winch 82 is attached to an upright 24 by means of a threaded winch fastener 96 inserted through a winch aperture 28 and the winch 82. The winch 82 can be any manually operated hoisting mechanism having a crank 92, which can be manipulated by means of a handle 94, to directly, or through a series of reduction gears, turn a drum 84, or other reel mechanism, to gather the first ends of the first cable 102 and the second cable 104 simultaneously in order to shorten the operable length of those cables 102 and 104. The winch 82 is preferably configured to have a wire rope guide 86 disposed on the drum 84 as seen in FIG. 4. The wire rope guide 86 is a spiral groove, or a pair of spiral grooves, formed into the material of the drum 84 which cause the cables 102 and 104 to align in sequential adjacent wraps as the winch 82 is turned. The winch 82 is also configured to have a drum latch mechanism 88 comprising a spring-biased latch engaging in a toothed wheel to retain the cables 102 and 104 in a preferred position to maintain the platform assembly 30 at a desired height.

The first cable 102 and the second cable 104 are each configured to have a cable loop 106 at a second end. The first cable 102 is inserted through the eye 114 of a snap hook 112 and doubled over on itself to form the cable loop 106 and secured in that position by means of at least one (1) cable clamp 122. The second cable 104 is configured similarly with another snap hook 112 engaged in a cable loop 106. The second end of first cable 102 is extended from the drum 84 of the winch 82 and routed over the third pulley 72 and then the first pulley 66 and then is attached to the farthest eyebolt 56 in the platform assembly 30 by means of engaging the hook 118 of the snap hook 112 into the eyebolt 56. The second end of the second cable 104 is similarly extended from the drum 84 of the winch 82 and routed over the second pulley 68 and then is attached to the nearest eyebolt 56 in the platform assembly 30 by means of engaging the hook 118 of the snap hook 112 into the eyebolt 56.

Referring now to FIG. 5, a perspective view of the apparatus 10, showing a fire box 130, according to an alternate embodiment of the present invention, is disclosed. This embodiment is envisioned to use the platform 10 as described above and illustrated in FIGS. 1 through 4. A fire box 130 is alternately provided for the apparatus 10 in the eventuality that a fire pit, or other such camp fire, is not conveniently available. The fire box 130 is configured to be a rectangular polyhedron having four (4) planar peripheral sidewalls 132 meeting at a bottom 134 to form an interior. The sidewalls 132 and the bottom 134 are preferably composed of steel plate continuously welded along all conjoined edges. Suspended from the interior of the sidewalls 132 is a coal bed 138 upon which a fire is built. The coal bed 138 preferably comprises expanded sheet metal. The fire box 130 is provided with at least one (1) handle 142 on an exterior of at least one (1) of the narrow sides for manipulating the fire box 130.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized in a simple and straightforward manner with little or no training. After initial purchase or acquisition of the apparatus 10, it would be assembled as indicated in FIG. 1, or alternately as shown in FIG. 5 with a fire box 130.

The method of installing and utilizing the apparatus 10 may be achieved by performing the following steps: acquiring a model of the apparatus 10; inserting the uprights 24 of each leg assembly 20 into the guides 48 of the platform assembly 30; tightening the locking pins 52; sliding the insert tubes 64 of the upper bar assembly 60 into the upper ends 26 of the uprights 24; attaching the winch 82 to the upright 24 in closest proximity to the second pulley 68 and the third pulley 72; threading the first cable 102 over the third pulley 72 and then over the first pulley 66; attaching the hook 118 of the snap hook 112 into the eyebolt 56 on the far side of the platform assembly 30; threading the second cable 104 over the second pulley 68; attaching the hook 118 of the snap hook 112 into the eyebolt 56 on the near side of the platform assembly 30; position the apparatus 30 over a fire pit or camp fire; and, placing food on the upper surface of the grate 42 of the platform assembly 30 or on the skewers 44 and cooking the food to the desired doneness. Alternately if a fire pit or other camp fire is not available a fire can be started in the fire box 130 by placing the desired fuel on the coal bed 138; igniting the fuel; and, placing the fire box 130 under the platform assembly 30 between the leg assemblies 20.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. An adjustable stage assembly, comprising:
   a platform assembly, comprising:
      a planar frame having an upper surface and a lower surface;
      a guide disposed on opposing sides of said planar frame, each guide comprising:
         an arm extending from said planar frame, said arm having an eyebolt aperture;
         a sleeve disposed at a distal end of each arm, said sleeve having a threaded sleeve aperture;
         an eyebolt for each eyebolt aperture, each eyebolt configured to removably affix to an individual eyebolt aperture via a retainer; and,
         a locking pin for each sleeve aperture, each locking pin configured to engage an individual sleeve aperture;
      a grate attached to said upper surface;
      wherein said platform assembly is configured to provide a support surface for an item placed thereon;
   two leg assemblies, each comprising:
      an upright having a lower end and an upper end; and,
      a horizontal stabilizer disposed on said lower end;
      wherein said upper end has a hollow construction;
      wherein said upper end is provided with a winch aperture;
      wherein an individual guide is configured to slidingly engage an individual upright; and,
      wherein said two leg assemblies are configured to support said platform assembly in an elevated position;
   a removable upper bar assembly, comprising:
      an upper tube having an insert tube attached perpendicularly at each distal end, wherein said insert tubes are configured to enable removable engagement of said removable upper bar with each leg assembly by slidable insertion of an individual insert tube into an individual upper end;
      a first pulley attached to said upper bar near an upper bar first distal end;
      a second pulley attached to said upper bar near an upper bar second distal end; and,
      a third pulley attached to said upper bar near said upper bar second distal end;
      wherein said first pulley and said second pulley are attached to be substantially at a same elevation above said upper bar; and,
      wherein said third pulley is attached to be at a greater elevation above said upper bar than said elevation of said first and second pulleys;
   at least one hoist assembly affixed to at least one leg assembly, each hoist assembly comprising:
      a winch affixed to an upper end via a threaded winch fastener inserted through said winch aperture;
      a first cable having a first cable first end and a first cable second end, wherein:
         said first cable first end is wound about said winch;
         said first cable second end is configured into a first cable loop; and,
         said first cable is routed over said third pulley and said first pulley and removably attached to an individual eyebolt;
      a second cable having a second cable first end and a second cable second end, wherein:
         said second cable first end is wound about said winch;
         said second cable second end is configured into a second cable loop; and,
         said second cable is routed over said second pulley and removably attached to an individual eyebolt;
      wherein actuation of each hoist assembly acts upon said first and second cables extending from it and said first, second, and third pulleys transfer tensile forces from said first and second cables to said platform assembly to cause said platform assembly to advance towards said removable upper bar assembly and retract away from said removable upper bar assembly.

2. The assembly recited in claim 1, wherein said planar frame is rectangular comprising two first tubes arranged parallel to each other and two second tubes arranged parallel to each other and perpendicular to each first tube.

3. The assembly recited in claim 2, further comprising at least one lateral tube spanning a length between said first tubes.

4. The assembly recited in claim 1, wherein said grate is expanded metal sheeting.

5. The assembly recited in claim 1, wherein said grate is a plurality of rods.

6. The assembly recited in claim 1, wherein each locking pin comprises a threaded rod with a tee handle.

7. The assembly recited in claim 1, wherein each winch is provided with rope guides disposed about a surface of a drum of said winch.

8. The assembly recited in claim 1, wherein each winch is provided with a handled crank.

9. The assembly recited in claim 1, wherein each winch further comprises a latch mechanism to retain each of said first and second cables in a preferred position to maintain said platform assembly at a desired height.

10. An adjustable stage assembly, comprising:
   a platform assembly, comprising:
      a planar frame having an upper surface and a lower surface;
      a guide disposed on opposing sides of said frame, each guide comprising:
         an arm extending from said planar frame, said arm having an eyebolt aperture;
         a sleeve disposed at a distal end of each arm, said sleeve having a threaded sleeve aperture;
         an eyebolt for each eyebolt aperture, each eyebolt configured to removably affix to an individual eyebolt aperture via a retainer; and,
         a locking pin for each sleeve aperture, each locking pin configured to engage an individual sleeve aperture;
      a grate attached to said upper surface; and,
      a plurality of skewers attached to said planar frame;
      wherein said platform assembly is configured to provide a support surface for an item placed thereon;
   two leg assemblies, each comprising:
      an upright having a lower end and an upper end; and,
      a horizontal stabilizer disposed on said lower end;
      wherein said upper end has a hollow construction;
      wherein said upper end is provided with a winch aperture;
      wherein an individual guide is configured to slidingly engage an individual upright; and,
      wherein said two leg assemblies are configured to support said platform assembly in an elevated position;
   a removable upper bar assembly, comprising:
      an upper tube having an insert tube attached perpendicularly at each distal end, wherein said insert tubes are configured to enable removable engagement of said removable upper bar with each leg assembly by slidable insertion of an individual insert tube into an individual upper end;
      a first pulley attached to said upper bar near an upper bar first distal end;
      a second pulley attached to said upper bar near an upper bar second distal end; and,
      a third pulley attached to said upper bar near said upper bar second distal end;
      wherein said first pulley and said second pulley are attached to be substantially at a same elevation above said upper bar; and,
      wherein said third pulley is attached to be at a greater elevation above said upper bar than said elevation of said first and second pulleys;
   at least one hoist assembly affixed to at least one leg assembly, each hoist assembly comprising:
      a winch affixed to an upper end via a threaded winch fastener inserted through said winch aperture;
      a first cable having a first cable first end and a first cable second end, wherein:
         said first cable first end is wound about said winch;
         said first cable second end is configured into a first cable loop; and,
         said first cable is routed over said third pulley and said first pulley and removably attached to an individual eyebolt;
      a second cable having a second cable first end and a second cable second end, wherein:
         said second cable first end is wound about said winch;
         said second cable second end is configured into a second cable loop; and,
         said second cable is routed over said second pulley and removably attached to an individual eyebolt;
   a fire box, comprising:
      a container;
      a coal bed disposed within said container; and,
      at least one handle disposed on an exterior of said container;
   wherein actuation of each hoist assembly acts upon said first and second cables extending from it and said first, second, and third pulleys transfer tensile forces from said first and second cables to said platform assembly to cause said platform assembly to advance towards said removable upper bar assembly and retract away from said removable upper bar assembly.

11. The assembly recited in claim 10, wherein said planar frame is rectangular comprising two first tubes arranged parallel to each other and two second tubes arranged parallel to each other and perpendicular to each first tube.

12. The assembly recited in claim 11, further comprising at least one lateral tube spanning a length between said first tubes.

13. The assembly recited in claim 10, wherein said grate is expanded metal sheeting.

14. The assembly recited in claim 10, wherein said grate is a plurality of rods.

15. The assembly recited in claim 10, wherein each locking pin comprises a threaded rod with a tee handle.

16. The assembly recited in claim 10, wherein each winch is provided with rope guides disposed about a surface of a drum of said winch.

17. The assembly recited in claim 10, wherein each winch is provided with a handled crank.

18. The assembly recited in claim 10, wherein each winch further comprises a latch mechanism to retain each of said first and second cables in a preferred position to maintain said platform assembly at a desired height.

* * * * *